US011306644B2

United States Patent
Fujino (10) Patent No.: US 11,306,644 B2
(45) Date of Patent: Apr. 19, 2022

(54) RADIATOR FAN

(71) Applicant: ISUZU MOTORS LIMITED, Tokyo (JP)

(72) Inventor: Ryusuke Fujino, Fujisawa (JP)

(73) Assignee: ISUZU MOTORS LIMITED, Tokyo (JP)

(*) Notice: Subject to any disclaimer, the term of this patent is extended or adjusted under 35 U.S.C. 154(b) by 0 days.

(21) Appl. No.: 16/755,611

(22) PCT Filed: Oct. 12, 2018

(86) PCT No.: PCT/JP2018/038067
§ 371 (c)(1),
(2) Date: Apr. 13, 2020

(87) PCT Pub. No.: WO2019/074090
PCT Pub. Date: Apr. 18, 2019

(65) Prior Publication Data
US 2020/0332699 A1    Oct. 22, 2020

(30) Foreign Application Priority Data

Oct. 13, 2017  (JP) .............................. JP2017-199557

(51) Int. Cl.
*F01P 7/06*     (2006.01)
*F04D 29/36*    (2006.01)
(Continued)

(52) U.S. Cl.
CPC ................ *F01P 7/06* (2013.01); *B60K 11/04* (2013.01); *F04D 19/002* (2013.01); *F04D 27/002* (2013.01); *F04D 29/366* (2013.01)

(58) Field of Classification Search
CPC ........ F01P 7/06; F04D 19/002; F04D 27/002; F04D 29/36; F04D 29/362; F04D 29/366; B60K 11/04
See application file for complete search history.

(56) References Cited

U.S. PATENT DOCUMENTS 1,685,323 A     9/1928  Hansen
3,299,963 A  *  1/1967  Kenneth ................... F01P 7/06
                                                            416/39

(Continued)

FOREIGN PATENT DOCUMENTS

DE            711847 C      10/1941
JP        43-004810 Y1       3/1968
(Continued)

OTHER PUBLICATIONS

International Search Report from International Application No. PCT/JP2018/038067 dated Dec. 25, 2018.

*Primary Examiner* — Devon C Kramer
*Assistant Examiner* — Joseph S. Herrmann
(74) *Attorney, Agent, or Firm* — Brundidge & Stanger, P.C.

(57) ABSTRACT

This radiator fan for cooling a radiator has: a rotating member that rotates due to rotation of an engine; blade members that are provided on the peripheral surface of the rotating member such that the angle of surfaces that receive air is changed; a moving member, which is provided in the rotating member, and which moves toward the peripheral surface of the rotating member due to centrifugal force generated by means of the rotation of the rotating member; and a connecting member, which is connected to the moving member and the blade members, transmits the movement of the moving member to the blade members, and changes the angle of the surfaces.

3 Claims, 7 Drawing Sheets

(51) Int. Cl.
*B60K 11/04* (2006.01)
*F04D 19/00* (2006.01)
*F04D 27/00* (2006.01)

(56) References Cited

U.S. PATENT DOCUMENTS

| | | | | |
|---|---|---|---|---|
| 3,522,795 A | * | 8/1970 | Seifert | F01P 7/087 123/41.12 |
| 3,760,779 A | * | 9/1973 | MacLennan | F01P 5/06 123/41.05 |
| 4,523,434 A | * | 6/1985 | Yoo | H05K 7/20172 62/116 |

FOREIGN PATENT DOCUMENTS

| | | |
|---|---|---|
| JP | 56-117091 U | 9/1981 |
| JP | 62-143031 U | 9/1987 |
| JP | 06-306890 A | 11/1994 |
| JP | 2005-153689 A | 6/2005 |
| JP | 2009-156212 A | 7/2009 |

\* cited by examiner

RADIATOR FAN

TECHNICAL FIELD

The present disclosure relates to a radiator fan.

BACKGROUND ART

In PTL 1, the following is disclosed: when the angle θ of blade 15 needs to be increased, handle 17D of handle device 17 is rotated in the direction of arrow C; and conversely, when the angle θ of blade 15 needs to be decreased, handle 17D of handle device 17 is rotated in the direction of arrow D (for example, paragraph [0023] and FIG. 3).

CITATION LIST

Patent Literature

PTL 1
Japanese Patent Application Laid-Open No. H06-306890

SUMMARY OF INVENTION

Technical Problem

However, in PTL 1, the angle of the blade of a radiator fan is changed manually, and it is not possible to change the angle of the blade while the radiator fan is rotating. Therefore, depending on the rotation speed of the radiator fan, the radiator may not be able to offer appropriate cooling performance.

For example, suppose that the angle of the blade is set so that a sufficient amount of air is fed to the radiator when the radiator fan is rotating at a low speed. In this case, when the radiator fan rotates at a high speed, the air resistance of the blade increases, and a sufficient amount air may not be fed to the radiator. Therefore, the radiator may not be able to offer appropriate cooling performance.

On the other hand, suppose that the angle of the blade is set so that the air resistance of the blade decreases when the radiator fan is rotating at a high speed. In this case, when the radiator fan rotates at a low speed, the amount of fed air decreases, and a sufficient amount of air may not be fed to the radiator. Therefore, the radiator may not be able to offer appropriate cooling performance.

An object of the present disclosure is to provide a radiator fan that enables a radiator to offer appropriate cooling performance.

Solution to Problem

A radiator fan according to one aspect of the present disclosure is a fan for cooling a radiator, including: a rotation member that rotates due to rotation of an engine; a blade member that is disposed on a peripheral surface of the rotation member in such a way that an angle of a surface thereof that receives air is changed; a movement member that is disposed in the rotation member and that moves toward the peripheral surface of the rotation member due to a centrifugal force generated by rotation of the rotation member; and a coupling member that is coupled to the movement member and the blade member, that transmits a movement of the movement member to the blade member, and that changes the angle of the surface.

Advantageous Effects of Invention

With the present disclosure, a radiator can offer appropriate cooling performance.

DESCRIPTION OF EMBODIMENTS

Hereafter, an embodiment of the present disclosure will be described with reference to the drawings.

Figure 1:
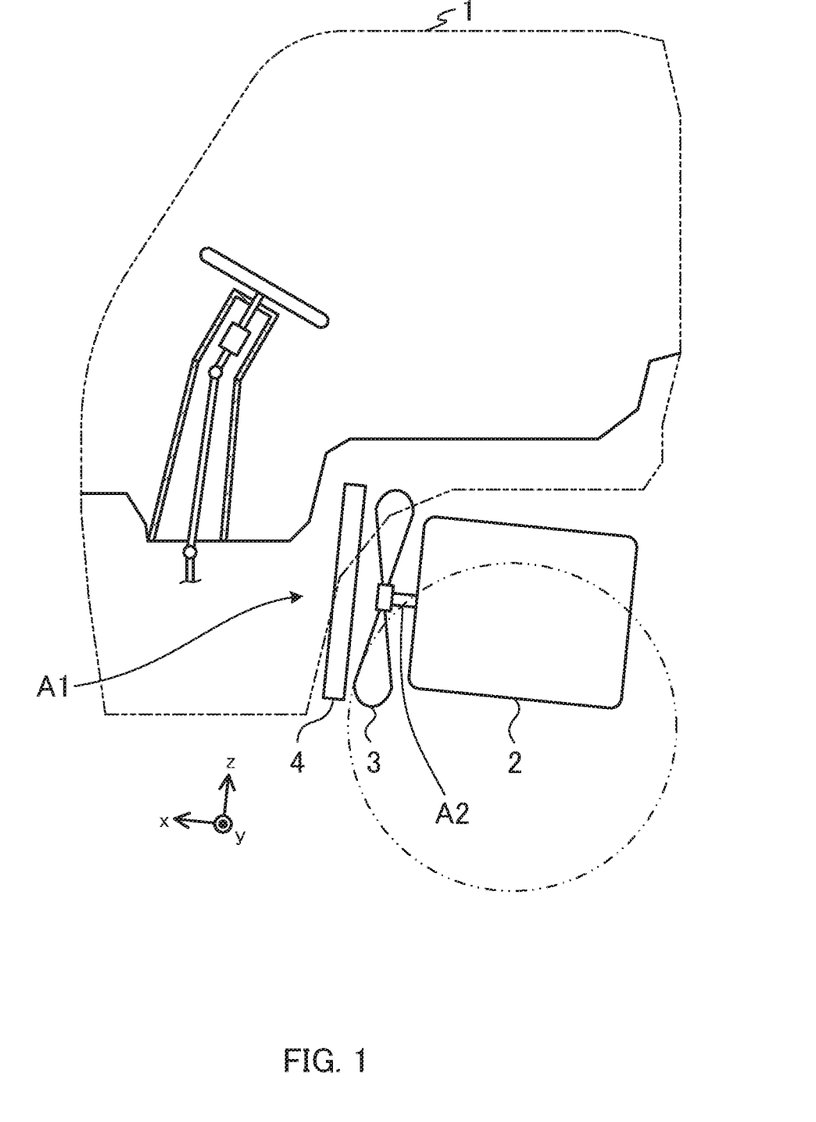
FIG. 1 is a partial view of a vehicle in which a radiator fan according to an embodiment is used.

FIG. 1 is a partial view of a vehicle in which a radiator fan according to the embodiment is used. As illustrated in FIG. 1, the vehicle includes cab 1, engine 2, radiator fan 3, and radiator 4. In the following, three coordinate axes are set as illustrated in FIG. 1.

The vehicle illustrated in FIG. 1 is, for example, a cab-over truck. The vehicle has engine 2 below cab 1.

Radiator fan 3 is disposed in front (in the x axis direction) of engine 2. Radiator fan 3 is rotated by a fan belt (not shown) that transmits rotation of the crank shaft of engine 2. The rotation speed of radiator fan 3 is proportional to the rotation speed of engine 2.

Radiator fan 3 has a plurality of blades. As described below in detail, the plurality of blades of radiator fan 3 are each configured so that the angle thereof changes in accordance with the rotation speed of engine 2.

Radiator 4 is disposed in front (in the x axis direction) of radiator fan 3. Radiator 4 is, for example, connected to a water jacket in engine 2 via a hose (not shown). Cooling water circulates through radiator 4 and the water jacket, and is cooled in radiator 4.

Drive airflow is taken in so as to pass through radiator 4 as indicated by arrow A1 due to rotation of radiator fan 3. Thus, cooling water in radiator 4 is cooled, and the cooled cooling water cools engine 2.

In the above description, the vehicle is a cab-over truck. However, the vehicle is not limited to this. Radiator fan 3 can be used in vehicles of other types, such as a cab-over van, a semi-cab-over truck, and the like.

Figure 2:
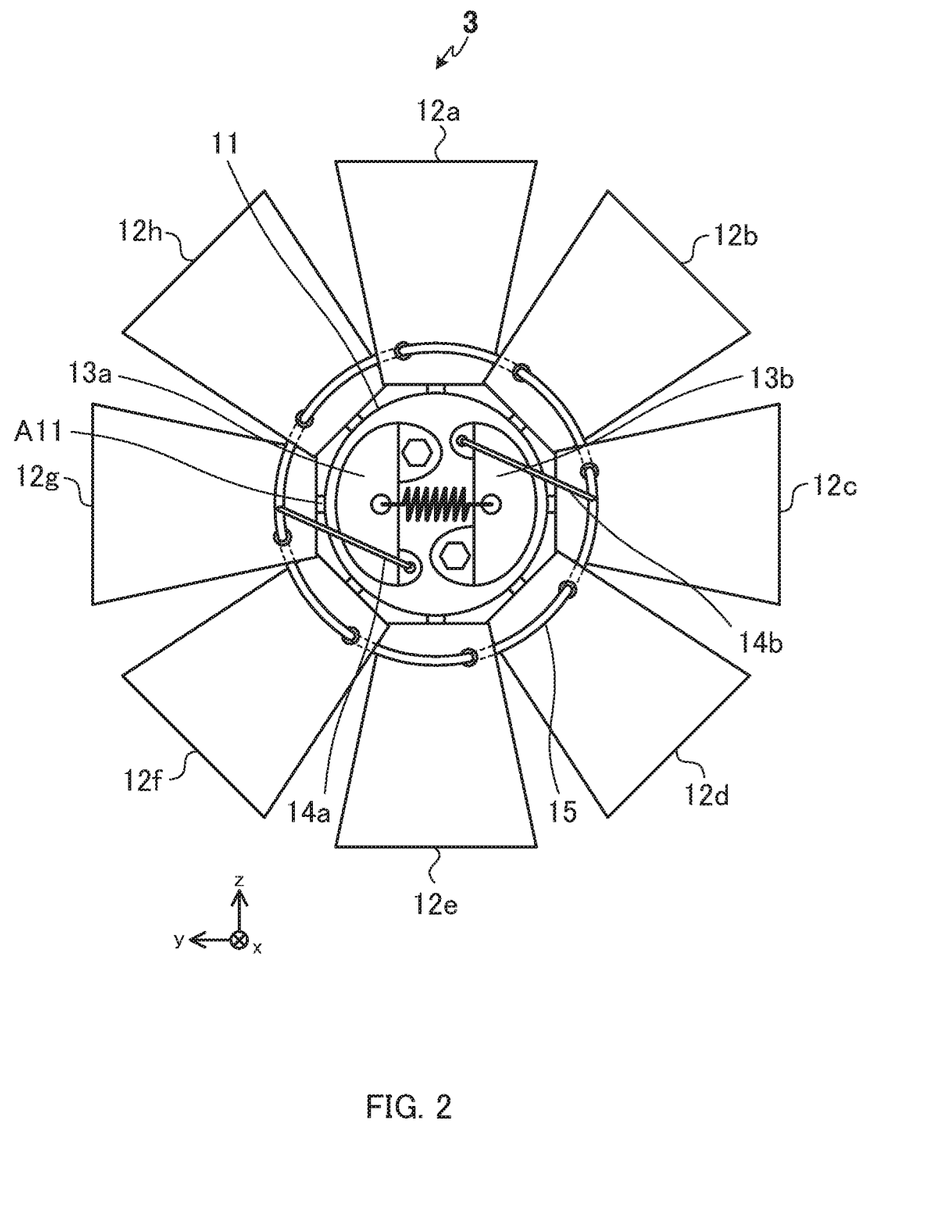
FIG. 2 illustrates the radiator fan as seen from the engine side.

FIG. 2 illustrates radiator fan 3 as seen from engine 2 side (as seen from the −x axis direction). As illustrated in FIG. 2, radiator fan 3 includes rotation member 11, blade members 12a to 12h, movement members 13a and 13b (a first weight and a second weight), and coupling members 14a, 14b, and 15.

Rotation member 11 has a hollow cylindrical shape, and contains movement members 13a and 13b therein. Although movement members 13a and 13b are illustrated in FIG. 2, in reality, movement members 13a and 13b cannot be seen because a cover member (refer to cover member 21 in FIG. 3) is attached to rotation member 11.

A shaft (refer to shaft A2 in FIG. 1 or shaft 22 in FIG. 3) is fixed to the cover member that is attached to rotation member 11, and a fan belt is looped over the shaft via a pulley. Rotation member 11 rotates due to rotation of engine 2, for example, clockwise in the figure.

Blade members 12a to 12h are rotatably disposed on a peripheral surface of rotation member 11.

Figure 3:
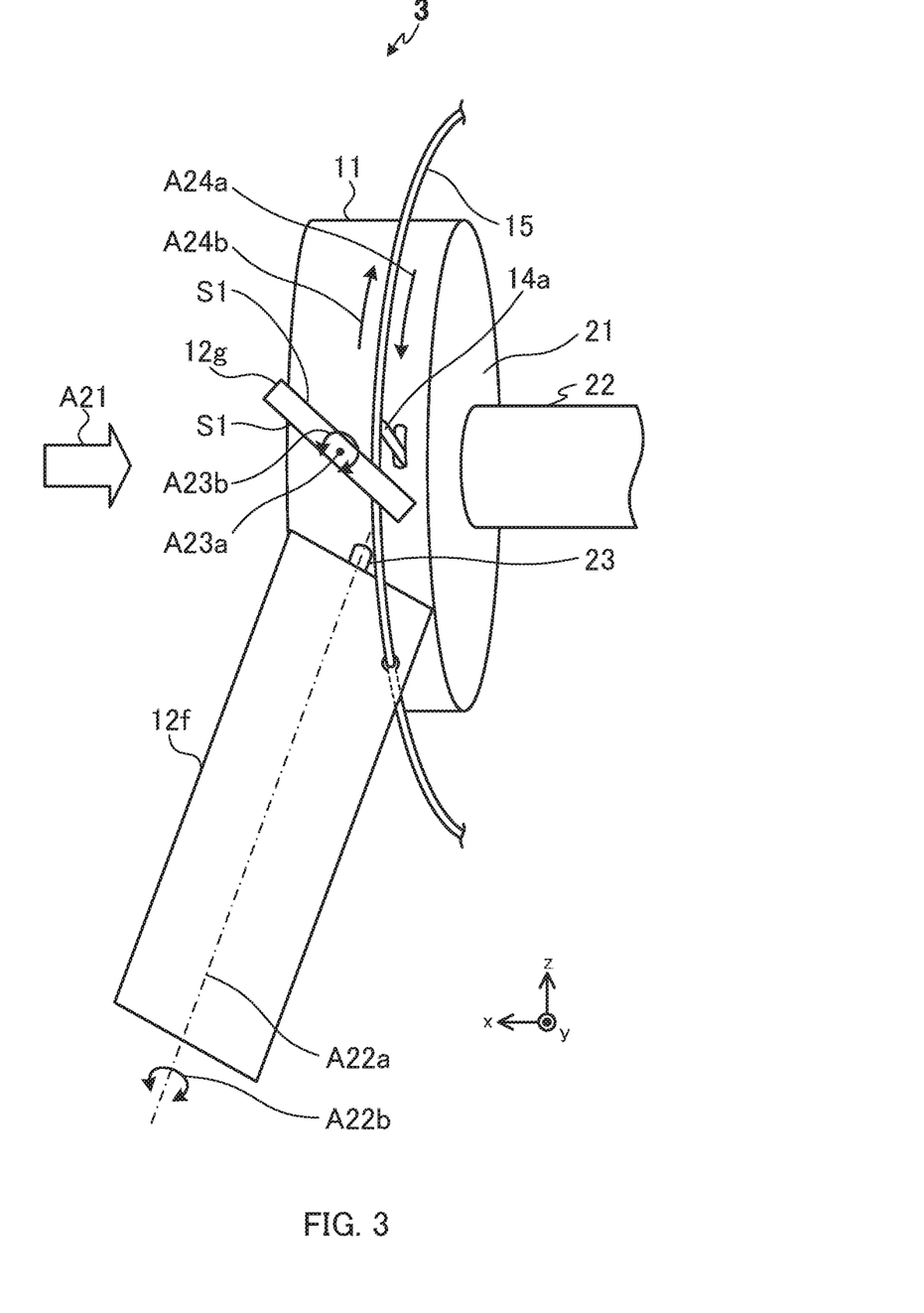
FIG. 3 illustrates the radiator fan as seen from the +y axis direction.

FIG. 3 illustrates radiator fan 3 as seen from the +y axis direction. In FIG. 3, blade members 12g and 12f, which are illustrated in FIG. 2, are illustrated. In FIG. 3, illustrations of the other blade members 12a to 12e and 12h, which are illustrated in FIG. 2, are omitted. In FIG. 3, coupling members 14a and 15, which are illustrated in FIG. 2, are illustrated.

Arrow A21 shown in FIG. 3 indicates flow of air (atmosphere). Air flows in the −x axis direction due to rotation of radiator fan 3. As illustrated in FIG. 3, radiator fan 3 includes cover member 21 and shafts 22 and 23.

Cover member 21 forms a bottom portion of hollow-cylindrical rotation member 11, and is fixed to rotation member 11.

Shaft 22 has a solid cylindrical shape, and one end of shaft 22 is fixed to rotation member 11. The other end of shaft 22 is rotatably fixed to engine 2. A fan belt (not shown) is looped over shaft 22 via a pulley (not shown), and rotates in one direction at a rotation speed in accordance with the rotation speed of engine 2. For example, shaft 22 rotates clockwise as seen from −x axis direction. Rotation member 11 rotates as shaft 22 rotates.

Shaft 23 has a solid cylindrical shape, one end of shaft 23 is coupled to the peripheral surface of rotation member 11, and the other end of shaft 23 is coupled to blade member 12f. Shaft 23 rotatably fixes blade member 12f to rotation member 11. That is, blade member 12f is fixed by shaft 23 to rotation member 11 so as to be rotatable relative to rotation member 11.

For example, central axis A22a, which is shown by a chain line in FIG. 3, represents the central axis of shaft 23. Blade member 12f is fixed to rotation member 11 so as to be rotatable in the directions of double-pointed arrow A22b shown in FIG. 3 with central axis A22a of shaft 23 as the rotation axis.

As with blade member 12f, blade member 12g is rotatably fixed to rotation member 11 by a shaft (refer to shaft A11 in FIG. 2).

For example, central axis A23a shown in FIG. 3 represents the central axis of the shaft (refer to shaft A11 in FIG. 2) that fixes blade member 12g to rotation member 11. Blade member 12g is fixed to rotation member 11 so as to be rotatable in the directions indicted by double-pointed arrow A23b shown in FIG. 3 with axis A23a as the rotation axis.

Coupling member 15 extends through blade members 12f and 12g. As described below in detail, coupling member 15 moves relative to rotation member 11 in the directions of arrows A24a and A24b shown in FIG. 3. Blade members 12f and 12g rotate in the directions indicated by double-pointed arrows A22b and A23b in synchronism with movements of coupling member 15 in the directions of arrows A24a and A24b.

Figure 4:
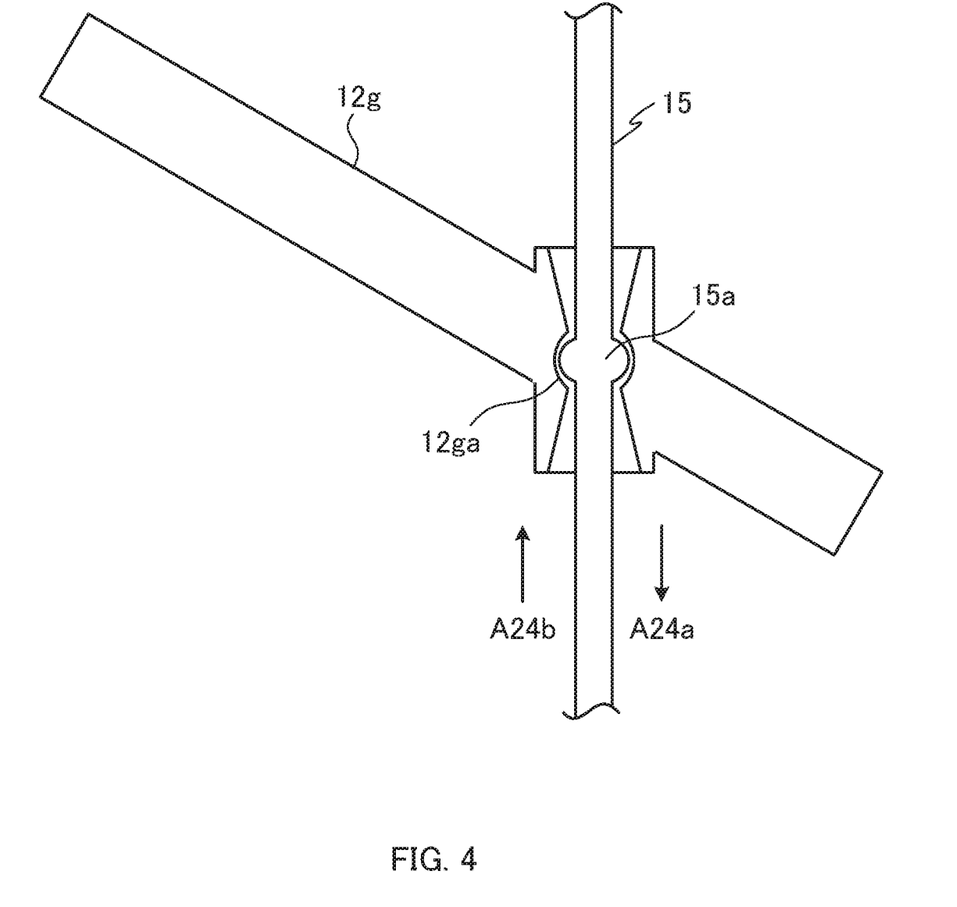
FIG. 4 illustrates an example of coupling of a blade member with a coupling member.

FIG. 4 illustrates an example of coupling of blade member 12g with coupling member 15. FIG. 4 illustrates a cross section of a coupling portion where blade member 12g and coupling member 15 are coupled (a portion where coupling member 15 extends through blade member 12g). In FIG. 4, elements that are the same as those in FIG. 3 are denoted by the same numerals.

As illustrated in FIG. 4, blade member 12g has spherical hole 12ga. Coupling member 15 has spherical protrusion 15a. Spherical protrusion 15a of coupling member 15 is fitted into spherical hole 12ga of blade member. Thus, blade member 12g rotates in synchronism with movements of coupling member 15 in the directions of arrows A24a and A24b.

Referring back to FIG. 3, in accordance with movements of coupling member 15 in the directions of arrows A24a and A24b, the angles of surfaces of blade members 12f and 12g that receive air are changed. For example, surface S1 shown in FIG. 3 is a surface of blade member 12g that receives air. As described above, blade member 12g rotates in the directions of double-pointed arrow A23b in synchronism with movements of coupling member 15 in the directions of arrows A24a and A24b. Therefore, the angle of surface S1 is changed in synchronism with movements of coupling member 15 in the directions of arrows A24a and A24b.

As with blade members 12f and 12g, the other blade members 12a to 12e and 12h, which are not illustrated in FIG. 3, are each rotatably fixed by a shaft to the peripheral surface of rotation member 11. Coupling member 15 extends through blade members 12a to 12e and 12h, and blade members 12a to 12e and 12h rotate in synchronism with movements of coupling member 15 in the directions of arrows A24a and A24b.

Referring back to FIG. 2, movement members 13a and 13b are disposed in hollow-cylindrical rotation member 11. Movement members 13a and 13b move toward the peripheral surface of rotation member 11 due to centrifugal forces generated by rotation of rotation member 11.

Coupling member 14a has a bar-like shape, one end of coupling member 14a is coupled to movement member 13a, and the other end of coupling member 14a is coupled to coupling member 15. Coupling member 14b has a bar-like shape, one end of coupling member 14b is coupled to movement member 13b, and the other end of coupling member 14b is coupled to coupling member 15.

Coupling member 15 has a ring shape and extends through blade members 12a to 12h. When movement members 13a and 13b move toward the peripheral surface of rotation member 11 due to centrifugal forces generated by the rotation of rotation member 11, the movements are transmitted to coupling member 15 by coupling members 14a and 14b, and coupling member 15 rotates relative to rotation member 11.

Figure 5:
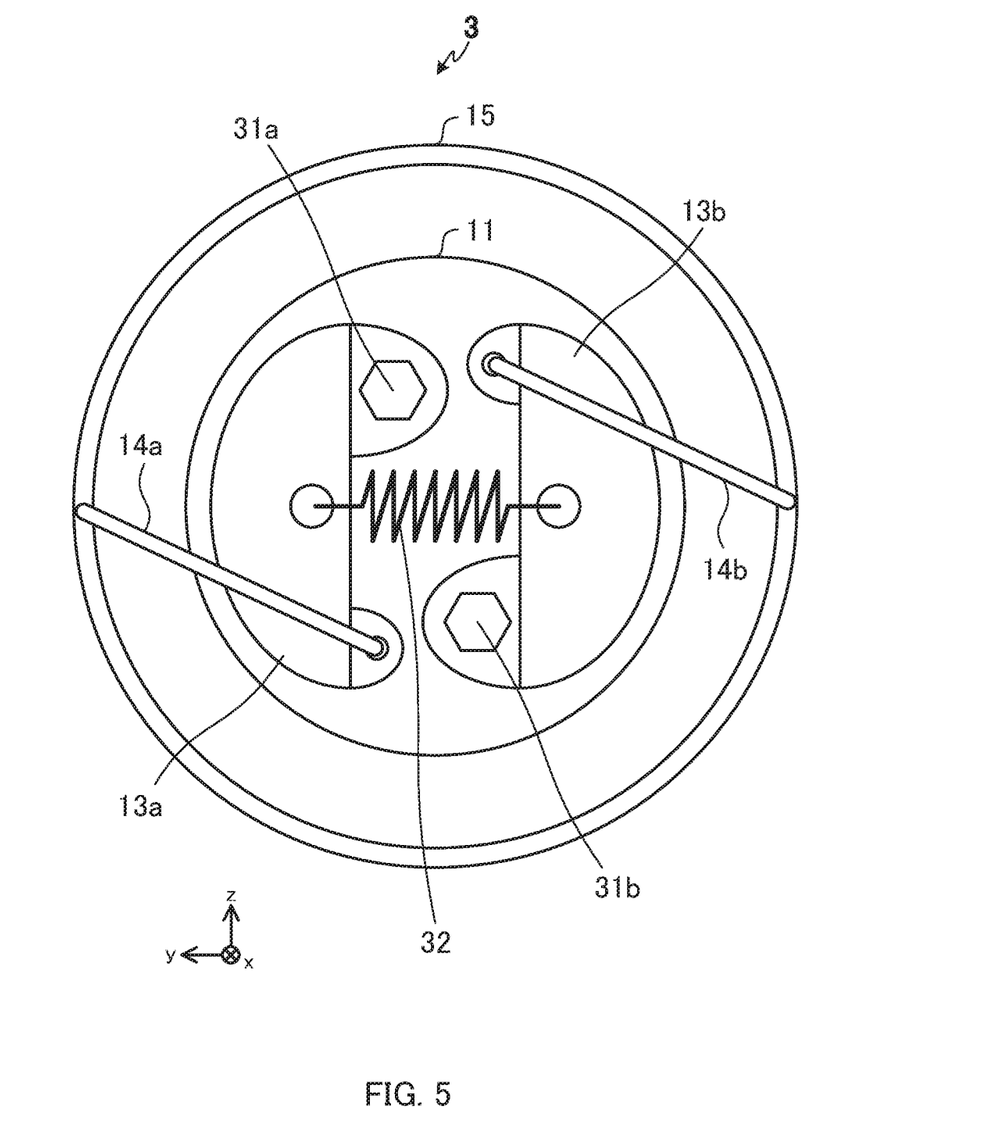
FIG. 5 illustrates a movement member and the coupling member.

FIG. 5 illustrates movement members 13a and 13b and coupling members 14a, 14b, and 15. In FIG. 5, rotation member 11 illustrated in FIG. 2; movement members 13a and 13b; and coupling members 14a, 14b, and 15 are illustrated. In FIG. 5, illustrations of blade members 12a to 12h, which are illustrated in FIG. 2, are omitted.

As illustrated in FIG. 5, radiator fan 3 includes shafts 31a and 31b and elastic member 32.

Shaft 31a is, for example, a bolt. One end of shaft 31a extends through movement member 13a and is fixed to a bottom portion (a bottom portion that faces cover member 21 illustrated in FIG. 3) of rotation member 11. Shaft 31a rotatably fixes movement member 13a to rotation member 11.

Shaft 31b is, for example, a bolt. One end of shaft 31b extends through movement member 13b and is fixed to a bottom portion (a bottom portion that faces cover member 21 illustrated in FIG. 3) of rotation member 11. Shaft 31b rotatably fixes movement member 13b to rotation member 11.

One end of elastic member 32 is fixed to movement member 13a, and the other end of elastic member 32 is fixed to movement member 13b. Elastic member 32 is, for example, a coil spring, and a force acts in a contracting direction.

Movement members 13a and 13b each have a semicircular shape. Movement members 13a and 13b are disposed in rotation member 11 so as to face the rotation axis (central axis) of rotation member 11. Movement members 13a and 13b are pulled toward each other by the force of the elastic member 32 in the contracting direction.

Figure 6:
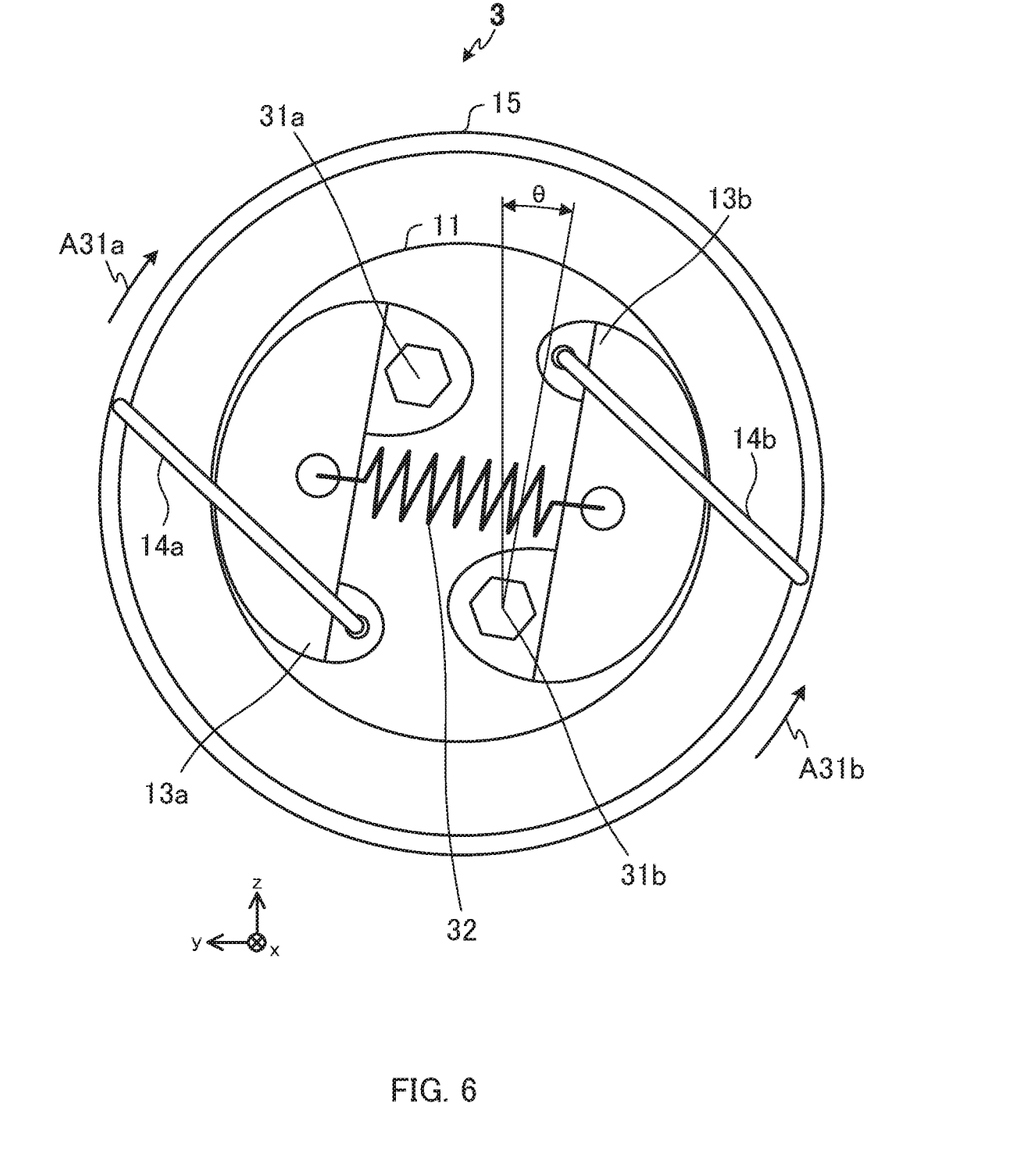
FIG. 6 illustrates movements of the movement member and the coupling member.

FIG. 6 illustrates movements of movement members 13a and 13b and coupling members 14a, 14b, and 15. In FIG. 6, elements that are the same as those in FIG. 5 are denoted by the same numerals.

When rotation member 11 rotates due to rotation of engine 2, centrifugal forces act on movement members 13a and 13b. When the centrifugal forces acting on movement members 13a and 13b become larger than the contracting force of elastic member 32, movement members 13a and 13b move toward the peripheral surface of rotation member 11.

For example, movement member 13b rotates clockwise in the figure by an angle θ with shaft 31b as the rotation axis, and moves toward the peripheral surface of rotation member 11. As with movement member 13b, movement member 13a rotates clockwise in the figure by the angle θ with shaft 31a as the rotation axis, and moves toward the peripheral surface of rotation member 11.

The angle θ increases in accordance with the centrifugal forces acting on movement members 13a and 13b. Accordingly, as the rotation speed of rotation member 11 increases, movement members 13a and 13b move closer to the peripheral surface of rotation member 11. As the rotation speed of rotation member 11 decreases, movement members 13a and 13b move away from the peripheral surface of rotation member 11, and move closer to the rotation axis of rotation member 11.

Coupling member 15 is coupled to movement members 13a and 13b via coupling members 14a and 14b. When movement members 13a and 13b move toward the peripheral surface in accordance with increase of the rotation speed of rotation member 11, the movements are transmitted by coupling members 14a and 14b, and coupling member 15 moves (rotates) in the direction of arrow A31a shown in FIG. 6. When movement members 13a and 13b move toward the rotation axis of rotation member 11 in accordance with decrease of the rotation speed of rotation member 11, the movements are transmitted by coupling members 14a and 14b, and coupling member 15 rotates in the direction of arrow A31b shown in FIG. 6.

Figure 7:
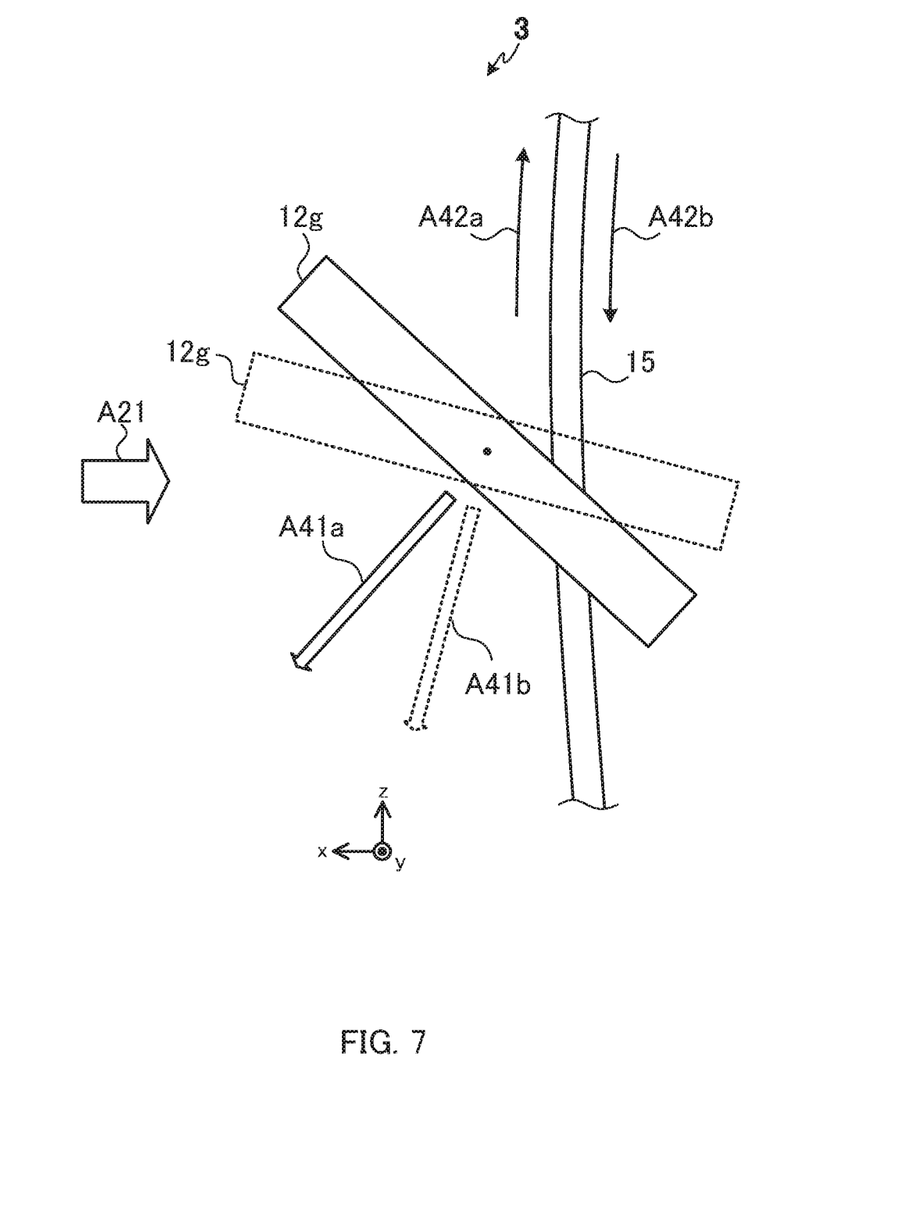
FIG. 7 illustrates a movement of the blade member.

FIG. 7 illustrates a movement of blade member 12g. In FIG. 7, blade member 12g illustrated in FIG. 3, and coupling member 15 are illustrated. In FIG. 7, arrow A21, which indicates flow of air shown in FIG. 3, is illustrated.

In FIG. 7, blade member 12g when rotation member 11 is not rotating (blade member 12g shown by a solid line) and blade member 12g when rotation member 11 is rotating (blade member 12g shown by a dotted line) are illustrated. Arrow A41a represents a normal line of a surface of blade member 12g when rotation member 11 is not rotating, and arrow A41b represents the normal line of the surface of blade member 12g when rotation member 11 is rotating.

As described above, coupling member 15 rotates relative to rotation member 11 in accordance with the rotation speed of rotation member 11. For example, when the rotation speed of rotation member 11 increases, coupling member 15 rotates in the direction of arrow A42a in FIG. 7. When the rotation speed of rotation member 11 decreases, coupling member 15 rotates in the direction of arrow A42b in FIG. 7.

Blade member 12g is coupled to coupling member 15, and rotates in accordance with rotation of coupling member 15. For example, when coupling member 15 rotates in the direction of arrow A42a due to increase of the rotation speed of rotation member 11, blade member 12g rotates from the state shown by the solid line to the state shown by the dotted line. When coupling member 15 rotates in the direction of arrow A42b due to decrease of the rotation speed of rotation member 11, blade member 12g rotates from the state shown by the dotted line to the state shown by the solid line.

In other words, the angle of the normal line of blade member 12g with respect to the rotation axis direction of rotation member 11 (+x axis direction) increases in accordance with the rotation speed of rotation member 11.

For example, as the rotation speed of rotation member 11 increases, the normal line represented by arrow A41a rotates counterclockwise in the figure, and the angle between the normal line and the rotation axis direction of rotation member 11 increases. As the rotation speed of rotation member 11 decreases, the normal line represented by arrow A41b rotates clockwise in the figure, and the angle between the normal line and the rotation axis direction of rotation member 11 decreases.

Thus, even when rotation member 11 rotates at a high speed, air resistance to blade member 12g decreases. For example, because blade member 12g rotates to the state shown by the dotted line as the rotation speed of rotation member 11 increases, it becomes easier for air to pass in the −x axis direction. That is, decrease of flow of air due to high-speed rotation is suppressed, and radiator fan 3 can suppress decrease of cooling performance of radiator 4.

Also when rotation member 11 rotates at a low speed, a large amount of air is fed in the −x axis direction, because blade member 12g rotates to the state shown by the solid line. That is, a large amount of air passes through radiator 4, and radiator fan 3 can suppress decrease of cooling performance of radiator 4.

Blade members 12a to 12f and 12h operate in the same manner as blade member 12g, which has been described with reference to FIG. 7.

As heretofore described, radiator fan 3 includes: rotation member 11 that rotates due to rotation of engine 2; and blade members 12a to 12h that are disposed on the peripheral surface of rotation member 11 in such a way that the angles of surfaces thereof that receive air are changed. Radiator fan 3 includes: movement members 13a and 13b that are disposed in rotation member 11 and that move toward the peripheral surface of rotation member 11 due to centrifugal forces generated by rotation of rotation member 11; and coupling members 14a, 14b, and 15 that are coupled to movement members 13a and 13b and blade members 12a to 12h, that transmit movements of movement members 13a and 13b to blade members 12a to 12h, and that change the angles of the surfaces of blade members 12a to 12h.

Thus, the angles of the surfaces of blade members 12a to 12h of radiator fan 3 change in accordance with the rotation speed of engine 2. Therefore, radiator fan 3 enables radiator 4 to offer appropriate cooling performance independently from the rotation speed of engine 2. For example, radiator fan 3 enables radiator 4 to offer appropriate cooling performance even when the rotation speed of engine 2 changes from a low rotation speed to a high rotation speed or changes from a high rotation speed to a low rotation speed.

In the above description, all of blade members 12a to 12h rotate in accordance with rotation of rotation member 11. However, rotations of blade members are not limited to these. For example, blade members 12a, 12c, 12e, and 12g may be fixed to the peripheral surface of rotation member 11, and blade members 12b, 12d, 12f, and 12h may rotate.

Blade members 12a to 12h may rotate gradually or may rotate in a stepwise manner, in accordance with the rotation speed of engine 2. For example, blade members 12a to 12h need not rotate until the rotation speed of rotation member 11 becomes a predetermined rotation speed, and may rotate to the maximum of the movable range when the rotation speed of rotation member 11 becomes the predetermined rotation speed.

The present application is based on Japanese Patent Application No. 2017-199557, filed on Oct. 13, 2017, the entire contents of which are incorporated herein by reference.

INDUSTRIAL APPLICABILITY

The present disclosure is useful for a radiator fan that enables a radiator to offer appropriate cooling performance.

REFERENCE SIGNS LIST

1 Cab
2 Engine
3 Radiator fan
4 Radiator
11 Rotation member
12a to 12h Blade member
13a, 13b Movement member
14a, 14b, 15 Coupling member
21 Cover member
22, 23, 31a, 31b Shaft
32 Elastic member

What is claimed is:

1. A radiator fan for cooling a radiator, comprising:
a rotation member that rotates due to rotation of an engine;
a plurality of blade members disposed around a peripheral surface of the rotation member in such a way that angles of surfaces of the plurality of blade members that receive air are variable;
a plurality of shafts that fixes the plurality of blade members to the peripheral surface of the rotation member so as to be rotatable;
a movement member, disposed in the rotation member, that moves toward the peripheral surface of the rotation member due to a centrifugal force generated by rotation of the rotation member; and
a coupling member that is directly coupled to the plurality of blade members, independent of the plurality of shafts, and coupled to the movement member, the coupling member directly transmitting a movement of the movement member to the plurality of blade members independent of the plurality of shafts, and changes the angles of the surfaces of the plurality of blade members,
wherein the coupling member comprises:
a first coupling member that has a ring shape and is directly coupled to the plurality of blade members by extending through the plurality of blade members; and
a second coupling member that has a bar-like shape, is coupled to the movement member and the first coupling member, and transmits the movement of the movement member to the first coupling member to rotate the first coupling member relative to the rotation member.

2. The radiator fan according to claim 1, wherein angles of normal lines of the surfaces of the plurality of blade members with respect to a rotation axis direction of the rotation member increase in accordance with a rotation speed of the engine.

3. The radiator fan according to claim 1, wherein:
the movement member includes a first weight and a second weight that are disposed so as to face a rotation axis of the rotation member, and
the radiator fan further comprises an elastic member that pulls the first weight and the second weight toward the rotation axis.

* * * * *